United States Patent
Green et al.

(10) Patent No.: US 9,922,339 B2
(45) Date of Patent: Mar. 20, 2018

(54) RANDOMIZED REWARD SYSTEM FOR STORED VALUE TRANSACTIONS

(71) Applicant: Google LLC, Mountain View, CA (US)

(72) Inventors: Travis Harrison Kroll Green, Washington, DC (US); Brian Richard Schneirow, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 430 days.

(21) Appl. No.: 13/834,444

(22) Filed: Mar. 15, 2013

(65) Prior Publication Data
US 2016/0140596 A1    May 19, 2016

(51) Int. Cl.
G06Q 30/02    (2012.01)

(52) U.S. Cl.
CPC ................. *G06Q 30/0226* (2013.01)

(58) Field of Classification Search
CPC .................................................. G06Q 30/0226
USPC ....................... 705/39, 40, 14.14, 14.1, 14.23
See application file for complete search history.

(56) References Cited

U.S. PATENT DOCUMENTS

| | | | | |
|---|---|---|---|---|
| 2002/0072968 A1* | 6/2002 | Gorelick | ................ | G06Q 30/02 705/14.23 |
| 2006/0247987 A1* | 11/2006 | Busch | .................... | G06Q 40/12 705/30 |
| 2006/0253320 A1* | 11/2006 | Heywood | .............. | G06Q 30/02 705/14.18 |
| 2008/0201226 A1* | 8/2008 | Carlson | ................ | G06Q 20/387 705/14.26 |
| 2010/0179868 A1* | 7/2010 | del Rosario | ....... | G06Q 30/0214 705/14.16 |

\* cited by examiner

*Primary Examiner* — Namrata Boveja
*Assistant Examiner* — Robert C Johnson
(74) *Attorney, Agent, or Firm* — Johnson, Marcou & Isaacs, LLC

(57) ABSTRACT

A transaction parameter date set comprising input variables characterizing the transaction conditions are collected when an electronic payment is initiated on an electronic payment system. The collected transaction input variables are used to calculate an expected future transaction value using a decision function. The expected future transaction value identifies high utility transaction based on a comparison of the expected future transaction value to a threshold value established while training the decision function on a training data set of known outcome. A high utility transaction can include behavior that if rewarded is likely to retain current users or grow the electronic payment system network by adding new users. If the expected future transaction value exceeds the threshold value the sender of the electronic payment is rewarded by the system.

19 Claims, 6 Drawing Sheets

210a

305

Determine an identity of the electronic payment recipient

310

Determine a frequency of interaction input between the sender and recipient of the electronic payment

315

Determine a location input of the recipient relative to the sender of the electronic payment

320

Determine a time of day input for the electronic payment transaction

325

Compile the frequency of interaction input, the location input, and the time of day input into a retention transaction parameter data set To 215 of Fig. 2

Determine a social network size input of the sender's social network

410

Determine a social network connectivity input identifying the number of connections the sender has with the recipient across different social networks

415

Determine a proximity input of the number of registered users within a defined distance of the sender

420

Determine a time of day input for the electronic payment transaction

425

Compile the social network size input, social connectivity input, proximity input, and time of day input into a new user transaction parameter data set To 215 of Fig. 2

Determine a merchant type input for the merchant recipient of the electronic payment

510

Determine a transaction volume input for the merchant recipient of the sender's electronic payment

515

Determine a payment amount input associated with the sender's electronic payment

520

Determine a merchant location input for the merchant recipient of the electronic payment

525

Compile the merchant type input, the transaction volume input, the payment amount input, and the merchant location input to generate a new merchant transaction parameter set To 215 of Fig. 2

Figure 5

RANDOMIZED REWARD SYSTEM FOR STORED VALUE TRANSACTIONS

TECHNICAL FIELD

The present disclosure relates to systems and methods for purchasing items online from local merchants. More particularly, the present disclosure provides systems and methods for distributing randomized rewards to users of a peer-to-peer payment system in order to promote and expand the payment system network.

BACKGROUND

Transaction networks, such as electronic wallet payment networks, grow by adding new nodes of users who can pay and be paid over the transaction network. This growth process can be slow as new users must first discover the system, realize a benefit to using the new payment system, and then create a habit of using the new payment system. Various methods have been used to try to accelerate the growth process for rewarding users based on certain desired behaviors. For example, a payment transaction network may reward an existing user a fixed monetary amount for each person they refer or by giving a certain percentage cash back or reward points for every dollar spent. These methods however typically focus on payment transactions with merchants, rather than peer-to-peer transactions, and apply rewards in a predictable manner that may not necessarily incentivize the growth behavior desired in a payment transaction network.

SUMMARY

In certain example aspects described herein, a method to distribute randomized rewards to users of an electronic payment system comprises detecting use of an electronic payment system to send an electronic payment, collecting a transaction parameter data set comprising inputs for estimating the value of future transactions involving at least one sender of an electronic payment and a recipient, determining an estimated future transaction value as a function of the collected inputs, comparing the estimated future transaction value to a threshold value, and communicating a reward to the sender or recipient of the electronic payment if the estimated future transaction value meets or exceeds the threshold value.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 3 is a block flow diagram depicting a method for compiling a retention transaction parameter data set, in accordance with certain example embodiments.

FIG. 4 is a block flow diagram depicting a method for compiling a new user transaction parameter data set, in accordance with certain example embodiments.

FIG. 5 is a block flow diagram depicting a method for compiling a new merchant transaction parameter data set, in accordance with certain example embodiments.

DETAILED DESCRIPTION OF THE EXAMPLE EMBODIMENTS

Overview

Figure 1:
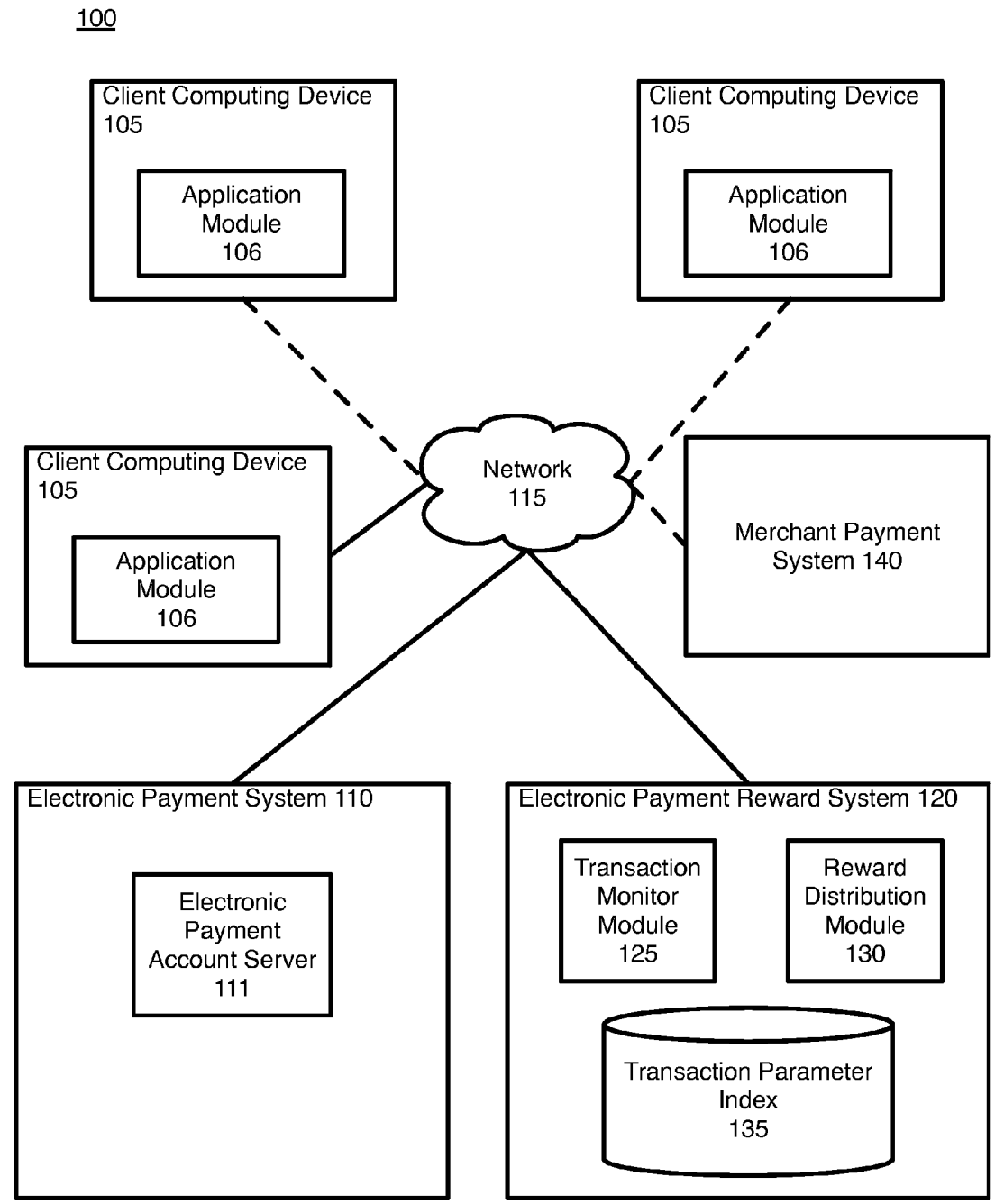
FIG. 1 is a block diagram depicting a system for distribution of randomized rewards associated with use of an electronic payment system, in accordance with certain example embodiments.

The methods and systems described herein enable an administrator of an electronic payment system to grow an electronic payment transaction network of registered users and merchants through the distribution of randomized rewards. By collecting a set of transaction parameter inputs when a registered user initiates an electronic payment using the electronic payment system, reward base incentives can be identified and distributed, and in certain embodiments, in a manner likely to maximize growth of the electronic payment transaction network.

The electronic payment reward system works in communication with an electronic payment system, such as an electronic wallet payment system. The electronic payment system includes a server hosting electronic payment accounts for multiple users. Registered users of the electronic payment system may access their accounts using an application module executing on a remote client computing device. In certain example embodiments, remote client computing devices may include, but are not limited to, personal computers, mobile phones, tablet computers, or other mobile communication computing devices. In certain example embodiments, the application module is a browser application. In certain other example embodiments, the application is a dedicated electronic payment application module, such as an electronic wallet application, executing on the remote client computing device.

To determine whether to reward a particular transaction, an initial decision function is defined and includes a set of input variables and corresponding weights for each variable. In addition, the decision function can define a threshold value for determining whether to provide a reward for a particular transaction.

When provided with a set of values for the input variables, the decision function calculates an expected future transaction value for similar transactions, transactions between the same parties to the current transaction, transactions involving one of the parties to the current transaction, and/or other desired transactions. The expected future transaction value can identify high utility transactions based on a comparison of the expected future transaction value to a threshold value established while training the decision function on a training data set. A training data set is a set of data values associated with a known outcome. According to example embodiments, high utility transactions are those transactions that if rewarded are likely to promote repeated use by existing registered users, the addition of new users, the addition of new merchants, or a combination thereof.

In certain example embodiments, multiple decision functions may be defined with each decision function analyzing a different set of input types, or transaction parameter data sets, depending on the type of behavior to be incentivized.

For example, a separate decision function may be defined for incentivizing repeat usage, addition of new users, or addition of new merchants.

In certain example embodiments, a current reward account amount is an input variable common to all decision functions. The reward account balance represents the current amount of funds available for distribution as rewards to selected users. For example, a reward budget amount may be weighted to decrease the frequency of distributed rewards as the reward budget value is used up over time and weighted to increase the distribution of rewards as the reward budget value is replenished or increased over time.

The electronic payment reward system detects when a user initiates a new electronic payment transaction via the electronic payment system. For ease of reference, a user may refer to a sender or a recipient of an electronic payment via the electronic payment system. The electronic payment reward system then collects input values for the transaction parameter sets. For example, the electronic payment system will identify the sender, the recipient, the payment amount, the sender's location, and the recipient's location. In some embodiments, the users (e.g., sender and recipient) may have to install an application and/or select a setting in order to obtain the benefits of the techniques described herein. For identifying transactions likely to increase repeated use by registered users, the electronic payment reward system also can determine input values such as frequency of interaction between the sender and the recipient, and in certain example embodiments, the time of day. For identifying transactions likely to result in new users, the electronic payment reward system also can determine input values such as the size of the sender's social network, the degree of connectivity between the sender and recipient across multiple social networks, the proximity of other registered user's in a defined proximity to the sender, and in some embodiments the time of day. For a new merchant transaction parameter data set, the electronic payment reward system also can determine input values for such factors as merchant type, merchant transaction volume, and the proximity of the merchant to other registered merchant users of the electronic payment system.

An expected future transaction value is then calculated by inputting the values of the collected transaction parameter data sets into the decision function. The calculated expected future transaction value is compared to a threshold value defined by the decision function. If the expected future transaction value is above the defined threshold value, the electronic payment reward system distributes a reward to the sender of the electronic payment, the recipient of the electronic payment, or both. For example, the electronic payment reward system may make the payment to the designated recipient on the sender's behalf. In other words, the system pays the transaction value, and the sender keeps the value of the transaction. In certain example embodiments, the payment reward system may further execute a second selection algorithm to those transactions with an expected future transaction value above the defined threshold to randomly select whether the payment transaction is rewarded.

Aspects of the example embodiments will be explained in more detail in the following description, read in conjunction with the figures illustrating the program flow.

Example System Architectures

Turning now to the drawings, in which like numerals represent like (but not necessarily identical) elements throughout the figures, example embodiments are described in detail.

FIG. 1 is a block diagram depicting a system 100 for distribution of randomized rewards associated with use of an electronic payment system, in accordance with certain example embodiments. As depicted in FIG. 1, the system 100 includes network devices 105, 110, 120, and 140 that are configured to communicate with one another via one or more networks 115.

Each network device 105, 110, 120, and 140 includes a device having a communication module capable of transmitting and receiving data over the network 115. For example, each network device 105, 110, 120, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 105, 110, 120, and 140 are operated by end-users or consumers, electronic payment system operators, electronic payment reward system operators, and merchants, respectively.

The end user can use an application module 106, such as a web browser application or a stand-alone application, to view, download, upload, or otherwise access documents or web pages via a distributed network 115. The network 115 includes a wired or wireless telecommunication system or device by which network devices (including devices 105, 110, 120, and 140) can exchange data. For example, the network 115 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer based environment.

It will be appreciated that the network connections shown are by way of example and other means of establishing a communications link between the computers and devices can be used. Moreover, those having ordinary skill in the art having the benefit of the present disclosure will appreciate that the client computing device 105, electronic payment system 110, electronic payment reward system 120, and merchant payment system 140 illustrated in FIG. 1 can have any of several other suitable computer system configurations. For example a client computing device 105 embodied as a mobile phone or handheld computer may not include all the components described above.

The components of the example operating environment 100 are described hereinafter with reference to the example methods illustrated in FIGS. 2-5.

Example Processes

Figure 2:
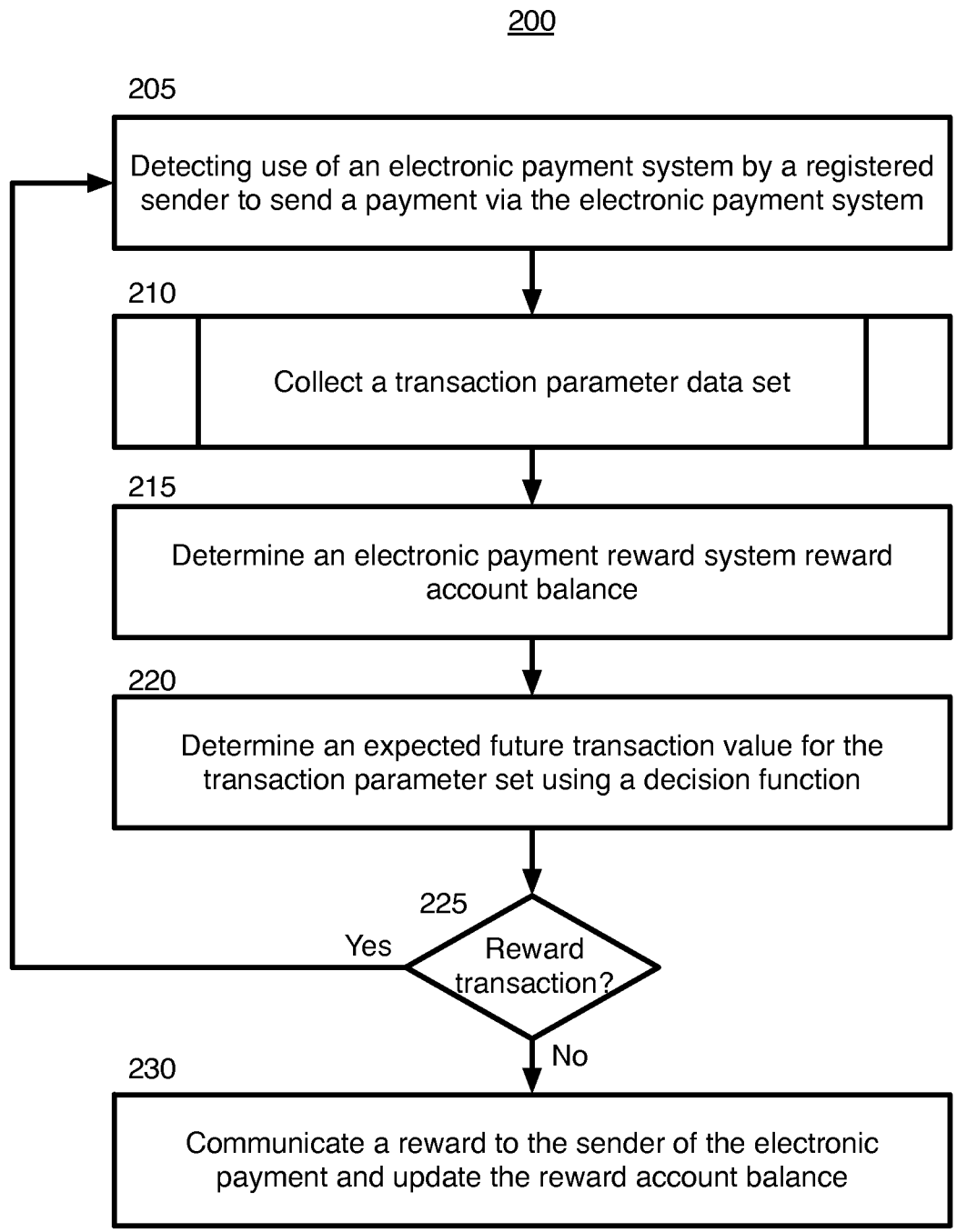
FIG. 2 is a block flow diagram depicting a method to distribute randomized rewards to users of an electronic payment system, in accordance with certain example embodiments.

FIG. 2 is a block flow diagram depicting a method 200 to distribute randomized rewards to users of an electronic payment system 110, in accordance with certain example embodiments.

Method 200 begins at block 205, where the transaction monitor module 125 detects use of an electronic payment system 110 by a registered user, or sender, of the electronic payment system 110. For example, a sender may signal the sender's intent to use the electronic payment system 110 through the application module 106 on a corresponding client computing device 105. The application module 106 comprises a user interface that allows the sender to initiate a payment using the electronic payment system 110. Each sender has a corresponding account identifier associated with an electronic payment account and stored on the electronic payment account server 111. In certain example embodiments, the electronic payment system 110 will communicate a notification to the transaction monitor module 125 indicating a given sender is preparing to authorize a payment via the electronic payment system 110. The notification comprises at least the sender account identifier.

At block 210, the transaction monitor module 125 collects a transaction parameter data set. The transaction monitor module 125 may store the collected transaction parameter data sets in the transaction parameter index 135. The transaction monitor module 125 may organize the transaction parameter data sets in the transaction parameter index 135 according a transaction identifier for each transaction or according to an account associated with the sender or recipient of the payment. A transaction parameter data set comprises values for a set of defined input variables. The input variables collected and analyzed by the electronic payment reward system 120 are based on the type of behavior to be encouraged. For example, the distribution of randomized rewards can be used to encourage repeated use of the electronic payment system 110 by registered users, or growth of the electronic payment system 110 network by the addition of new users and merchants. More than one transaction parameter data set may be collected for each electronic payment transaction. Example transaction parameter data sets and their corresponding input variables are described in further detail hereinafter with reference to FIGS. 3-5.

FIG. 3 is a block flow diagram depicting a method 210a for compiling a retention transaction parameter data set, in accordance with certain example embodiments.

Method 210a begins at block 305, where the transaction monitor module 125 begins collection of a retention transaction parameter data set by identifying the electronic payment recipient of the electronic payment transaction. For example, the electronic payment system 110 may communicate a recipient identifier designated by the user initiating the electronic payment via the electronic payment system 110. The recipient identifier may be the recipient's electronic payment system 110 account identifier, a social network account identifier, an email address, or a personal telephone number.

At block 310, the transaction monitor module 125 determines a frequency of interaction input between the sender and recipient of the electronic payment system 110. For example, the transaction monitor module 125 may use the sender identifier, recipient identifier, or both to determine a number of past electronic payment transactions between the sender and the recipient. The transaction monitor module 125 may also determine a frequency of interaction input based on the number of past interactions between the sender and the recipient on a social network. For example, the electronic payment system 110 may be associated with a social network and other electronic services such as instant messaging and email. The user may use a common identifier to access a primary account for the associated electronic services. Accordingly, the transaction monitor module 125 may use the sender identifier, recipient identifier, or both to determine the frequency of interaction between the sender and recipient. For example, the transaction monitor module 125 may look at the frequency of communications, such as posts and direct messages, between the sender and recipient on a social network, the frequency of instant messages exchanged between the sender and the recipient, the frequency of email exchanges between the sender and the recipient, or a combination thereof.

At block 315, the transaction monitor module 125 determines a location input of the recipient relative to the sender of the electronic payment. For example, many client computing devices 105, and the social networking applications executing on them, include a current location mapping function or a "check in" function that updates the status of the user of the client computing device 105 to indicate a current location. Likewise, the application module 106 on the client computing device 105 used to access the electronic payment system 110 may have a current location mapping function. The transaction monitor module 125 may use this location information to determine the proximity of the recipient to the sender, as well as the proximity of the sender to other registered users of the electronic payment system 110. In certain example embodiments, the electronic payment reward system 120 may weigh transactions where users are in closer proximity to one another higher than compared to when users are farther apart.

At block 320, the transaction monitor module 125 determines a time of day input for the electronic payment transaction. For example, the electronic payment system 110 may communicate a time stamp for the electronic transaction with the notification of the electronic transaction to the transaction monitor module 125, or the transaction monitor module 125 may determine a time of day input from an internal clock module associated with the electronic payment reward system 120. In certain example embodiments, the electronic payment reward system 120 may weigh certain times of day higher than compared to other time of day. For example, a time of day when people are normally socializing, such as after work, may be weighted higher than a time of day when people are more likely occupied with other activities such as work.

At block 325, the transaction monitor module 125 compiles the collected input variables, such as the frequency of interaction input, the location input, and the time of day input, into a retention transaction parameter data set and communicates the retention transaction parameter data set to the reward distribution module 130. The method then proceeds to block 215 of FIG. 2.

FIG. 4 is a block flow diagram depicting a method 210b for compiling a new user transaction parameter data set, in accordance with certain example embodiments.

Method 210b begins at block 405, where the transaction monitor module 125 begins collection of a new user transaction parameter data set by determining a social network size input of the sender's social network. The social network size input of the sender may be obtained in substantially the same way as described previously with reference to block 310 of FIG. 3 except rather than determining the frequency of interaction between the sender and the recipient the transaction monitor module 125 determines the number of all users connected to the sender in their social network. In certain example embodiments, a social network size input indicating a large degree of social connectivity may be weighted more than a social network size input indicating a lesser degree of social connectivity. In certain other example embodiments, the transaction monitor module 125 may assign a higher weight to a sender or recipient who have not yet used the electronic payment system 110 and have a higher number of social contacts than those who have not used the electronic payment system 110 and/or have fewer social contacts At block 410, the transaction monitor module 125 determines a social connectivity input identifying the number of connections a sender has with the recipient across different social networks. For example, the transaction monitor module 125 may use the recipient and sender identifiers to access their contacts or friend list and calculate the size of the intersection of the sender and recipient's primary contacts or the number of common "friends" the sender and recipient share.

At block 415, the transaction monitor module 125 determines a proximity input of the number of registered users within a defined distance of the sender. The proximity input may be obtained in substantially the same way as described for determining the location input with reference to block 315 of FIG. 3. In certain example embodiments, the electronic payment reward system 120 may weigh a proximity input where several registered users are in close proximity to one another higher than a proximity input where a smaller number of registered users are in close proximity to one another.

At block 420, the transaction monitor module 125 determines a time of day input for the electronic payment transaction. The time of day input may be determined substantially as described in block 320 of FIG. 3. In certain example embodiments, the electronic payment reward system 120 may weigh a time of day when individuals are usually socializing, such as after work, than a time of day when individuals are usually occupied with other activities such as work.

At block 425, the transaction monitor module 125 compiles the collected input variables, such as the social network size input, the social network connectivity input, the proximity input, and the time of day input, into a new user transaction parameter data set and communicates the new user transaction parameter data set to the reward distribution module 130. The method then proceeds to block 215 of FIG. 2.

FIG. 5 is a block flow diagram depicting a method 210c for compiling a new merchant transaction parameter data set, in accordance with certain example embodiments.

Method 210c begins at block 505, where the transaction monitor module 125 begins collecting a new merchant transaction parameter set by determining a merchant type input for the merchant recipient of the electronic payment. For example, the transaction monitor module 125 may determine from the payee name designated in the electronic payment transaction details the merchant type, such as restaurant, sporting goods store, grocery store, or electronic store. In certain example embodiments this may be done by cross-referencing the payee name with a database containing a listing of merchants according to merchant types. In certain example embodiments, the transaction monitor module 125 may prompt the user to specify a merchant type when the merchant type can not be determine by cross-referencing the payee's name. In certain example embodiments, a the electronic payment reward system 120 may keep record of how many merchants of a given merchant type currently accept payments from the electronic payment system 110. A merchant belonging to a merchant type that has a number merchants accepting payment from the electronic payment system 110 below a defined cutoff value may be weighted more than a merchant belonging to a merchant type that has more merchants accepting payments from the electronic payment system 110.

At block 510, the transaction monitor module 125 determines a transaction volume input for the merchant recipient. For example, the transaction monitor module 125 may access a secondary database containing transaction volume information for the specific merchant or a merchant type to which the merchant belongs to determine the total number or average number of transactions the merchant or a merchant of that type typically makes over a given time period. In certain example embodiments, the transaction monitor module 125 may determine the transaction volume input for a merchant by analyzing all past payments made to the merchant made using the electronic payment system 110. For example, while a new merchant may not yet accept payments using an application module 106 on a remote client device 105, the merchant may have a transaction history on the electronic payment system 110 resulting from accepting payment for web-based orders using the electronic payment system 110. In certain example embodiments, a high transaction volume input may be weighted more than a low transaction volume input.

At block 515, the transaction monitor module 125 determines a payment amount input associated with the user's electronic payment. The payment amount input may be determined from the payment transaction details provided by the application module 106 or electronic payment system 110.

At block 520, the transaction monitor module 125 determines a merchant location input for the merchant recipient of the electronic payment. In certain example embodiments, the merchant location input can be determined from the location of the client computing device 105 when initiating the electronic payment transaction. The client computing device 105 location may be obtained in substantially the same way as described for determining the location input with reference to block 315 of FIG. 3. In certain example embodiments, a merchant that is not located with a defined distance of other merchants already accepting payments from the electronic payment system 110 may be weighted more than a merchant with a location input within a define distance to a defined number of merchants already accepting payments from an electronic payment system 110.

At block 525, the transaction monitor module 125 compiles the collected input variables, such as the merchant type input, the transaction volume input, the payment amount input, and the merchant location input, into a new merchant transaction parameter data set and communicates the new merchant transaction parameter data set to the reward distribution module 130. The method then proceeds to block 215 of FIG. 2.

Returning to FIG. 2 at block 215, where the reward distribution module 130 determines an electronic payment reward system 120 reward account balance. An initial reward account balance may be set by an operator of the electronic payment reward system 120. As rewards are distributed to users from the reward account balance, the reward distribution module 130 updates the reward account balance. The reward account balance may be replenished as needed by an operator of the electronic payment reward system 120.

At block 220, the reward distribution module 130 determines an expected future transaction value for the transaction parameter set or sets provided by the transaction monitor module 125 in block 210 using a decision function. A decision function defines a set of weights for each input variable in a transaction parameter set and a threshold value. The weights and threshold values can be determined using a training set of input variable such as the input variables defined above for the various transaction parameter sets. In certain example embodiments, training of the decision function on a set of putative input variables can be used to indentify a subset of high utility transaction variables for use in the transaction parameter sets. In addition, the recorded transaction parameter set data collected in block 210 may be used to update and revise the weights and threshold values of the decision function. Methods for deriving a decision function include supervised learning methods such as support vector machines, linear/logistic regression, neural networks, nearest neighbor and naive bayes, and unsupervised learning methods such as k-means and self-organizing map When provided with a set of values for the various input types, the decision function calculates an expected future transaction value. The expected future transaction value identifies high utility transactions. High utility transactions are those transactions that if rewarded are likely to promote repeated use by existing registered user, the addition of new users, the addition of new merchants, or a combination thereof. High utility transactions may be measured by historic data collected on the variable inputs present when the desired sender or recipient behavior was realized concurrent with a payment transaction via the electronic payment system 110. In certain example embodiments, multiple decision functions may be defined with each decision function analyzing a different set of input types, or transaction parameter data sets, depending on the type of behavior to be incentivized. For example, a separate decision function may be defined for identifying repeat usage, addition of new users, or addition of new merchants. In certain example embodiments, the decision function determines the marginal number of additional transactions likely to result if the current payment transaction is rewarded. The marginal number refers to the number of expected new transactions to be created by applying the reward above a projected baseline where the reward is not given.

In certain example embodiments, a current reward account amount is an input variable common to all decision functions. The reward account balance represents the current amount of funds available for distribution as rewards to selected users. For example, a reward budget amount may be weighted to decrease the frequency of distributed rewards as the reward budget value is used up over time and weighted to increase the distribution of rewards as the reward budget value is replenished or increased over time. In certain example embodiments, a payment is an input variable common to all transaction parameter data sets.

At block 225, the reward distribution module 130 determines whether to reward the payment transaction by comparing the expected future transaction value to the threshold value for the decision function used. For example, the reward distribution module 130 may access a data table comprising a decision function identifier for each transaction parameter data set and its corresponding threshold value. The reward distribution module 130 then compares the expected future transaction value determined in block 220 above to the corresponding threshold value stored in the data table. In certain example embodiments, if the expected future transaction value is equal to or greater than the threshold value, the reward distribution module 130 will distribute a reward to the user and the method proceeds to block 230. In certain example embodiments, the reward distribution module 130 may then execute a second selection algorithm before determining to reward the transaction. For example, the reward distribution module 130 may execute a die rolling algorithm that requires a defined value from a finite set of values, such as the values of a six-sided die, be randomly selected when the algorithm executes before the payment transaction is rewarded.

At block 230, the reward distribution module 130 communicates a reward to the sender of the electronic payment and updates the reward account balance. In certain example embodiments, the reward may comprises, for example, covering the payment on the user's behalf, partially or fully reimbursing the user for the payment, or providing the user with a voucher or other item of redeemable value for future use.

Returning to block 225, if the expected future transaction value is less than the threshold value, the reward distribution module 130 does not reward the user initiating the electronic payment and the method returns to block 205 to continue to monitor future electronic payment transactions.

Example Systems

Figure 6:
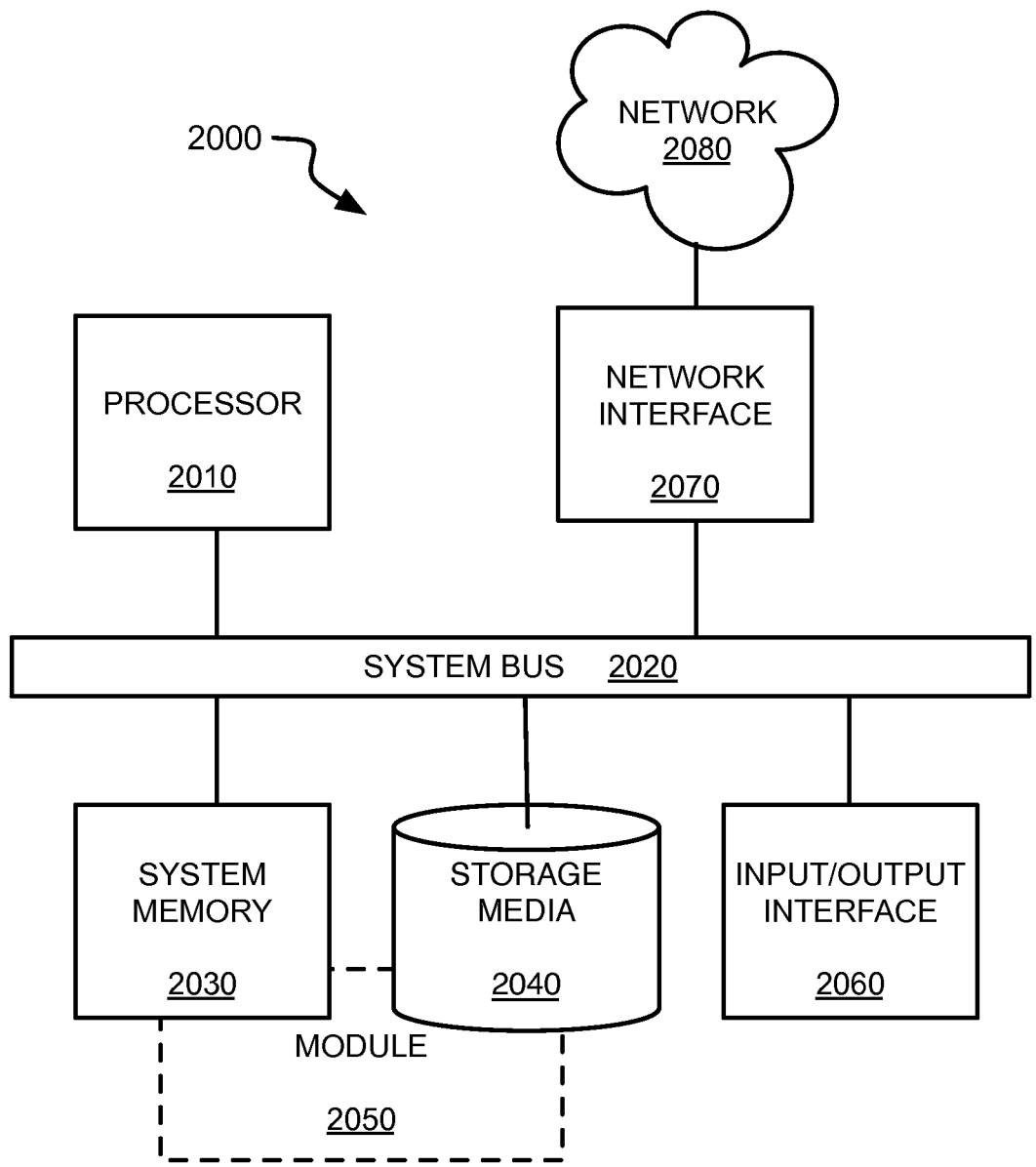
FIG. 6 is a block diagram depicting a computing machine and a module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to distribute randomized rewards to users of electronic payment systems, comprising:

detecting, using one or more computers of an electronic payment system, a notification from an application executing on a separate remote computing device associated with a sender, the notification indicating an intent of the sender to use the electronic payment system to send an electronic payment from a sender electronic account maintained on the electronic payment system to a recipient payment account, the application comprising a user interface that allows a payment to be initiated via the electronic payment system;

receiving, using the one or more computers, a transaction parameter data set comprising inputs for estimating a value of future transactions involving at least one of the sender and the recipient, the inputs comprising items related to the electronic payment and items that are not related to the electronic payment;

storing, using the one or more computers, the received transaction parameter data set in a transaction parameter data index maintained by the electronic payment system;

determining, using the one or more computers, an estimated future transaction value involving at least one of the sender and the recipient using a decision function, the decision function defining a weight for each of the received inputs, wherein the estimated future transaction value indicates a number of estimated additional payment transactions that will result if the current electronic payment is rewarded;

comparing, using the one or more computers, the estimated future transaction value to a threshold value defining a limit at which rewarding the sender or the recipient of the electronic payment may incentivize future use of the electronic payment system; and in response to the estimated future transaction value meeting or exceeding the threshold value, communicating, using the one or more computers, a notification of a reward to the application executing on the remote computing device associated with the sender for display on the remote computing device associated with the sender.

2. The method of claim 1, the transaction parameter data set comprising a retention transaction parameter data set comprising a frequency of interaction input between the sender and the recipient, a location information input of the sender and recipient, and a time a day input for the electronic payment.

3. The method of claim 2, the frequency of interaction being based at least in part on a number of interactions between the sender and the recipient on one or more social networks over a time period.

4. The method of claim 2, the frequency of interaction being based at least in part on a frequency of check-in information, the check-in information indicating when the sender and recipient are at a same location during a corresponding time period.

5. The method of claim 1, the transaction parameter data set comprising a new user transaction parameter data set comprising a size of the sender's social graph input, a size of the recipient's social graph input, a time of day input for the electronic payment, and a number of electronic payment system users at the recipient's location input.

6. The method of claim 1, the transaction parameter data set comprising a new merchant transaction parameter data set comprising a transaction volume input for the merchant, a payment amount input for the electronic payment, a merchant type input, and a merchant location input.

7. The method of claim 1, the electronic payment system comprising an electronic wallet payment system.

8. The method of claim 1, the expected transaction value comprising an estimated marginal number of new users if the sender is rewarded for the payment transaction.

9. The method of claim 1, wherein the transaction parameter data set comprises a reward account balance value available for the reward.

10. The method of claim 1, wherein the reward is determined based at least in part on the estimated value of future transactions.

11. A computer program product, comprising:
a non-transitory computer-executable storage device having computer-readable program instructions embodied thereon that when executed by a computer cause the computer to distribute randomized rewards to users of electronic payment systems, the computer-executable program instructions comprising:
computer-executable program instructions to receive a transaction parameter data set comprising inputs for estimating a value of future transactions involving at least one of a sender and a recipient, the inputs comprising items related to the electronic payment and items that are not related to the electronic payment, wherein the received transaction parameter data set is received from an application execution on a remote computing device associated with the sender, and wherein the received transaction parameter data set is stored in a transaction parameter index;
computer-executable program instructions to determine the estimated value of future transactions involving at least one of the sender and the recipient using a decision function, the decision function defining a weight for each of the collected inputs, wherein the estimated future transaction value indicates a number of estimated additional payment transactions that will result if the current electronic payment is rewarded;
computer-executable program instructions to compare the estimated future transaction value to a threshold value defining a limit at which rewarding the sender or the recipient of the electronic payment may incentivize future use of the electronic payment system
computer-executable program instructions to communicate a notification a reward to an application executing on a remote computing device associated with the sender for display on the remote computing device, in response to the estimated future transaction value meeting or exceeding the threshold estimated future transaction value.

12. The computer program product of claim 11, further comprising computer-readable program instructions to detect use of an electronic payment system to send an electronic payment from a sender to a recipient, the sender of the electronic payment being a registered user of the electronic payment system.

13. The computer program product of claim 11, the transaction parameter data set comprising a retention transaction parameter data set comprising a frequency of interaction input between the sender and the recipient, a location information input of the sender and recipient, and a time a day input for the electronic payment.

14. The computer program product of claim 11, the transaction parameter data set comprising a new user transaction parameter data set comprising a size of the sender's social graph input, a size of the recipient's social graph input, a time of day input for the electronic payment, and a number of electronic payment system users at the recipient's location input.

15. The computer program product of claim 11, the transaction parameter data set comprising a new merchant transaction parameter data set comprising a transaction volume input for the merchant, a payment amount input for the electronic payment, a merchant type input, and a merchant location input.

16. A system to distribute randomized rewards to users of electronic payment systems, comprising:
a storage device; and
a processor communicatively coupled to the storage device, wherein the processor executes application code instructions that are stored in the storage device to cause the system to:
detect a notification from an application executing on a remote computing device associated with a sender, the notification indicating an intent of the sender to use an electronic payment system to send an electronic payment from the sender to a recipient, the sender of the electronic payment being a registered user of the electronic payment system;
receive a transaction parameter data set comprising inputs for estimating a value of future transactions involving at least one of the sender and the recipient, the inputs comprising items related to the electronic payment and items that are not related to the electronic payment;
determine the estimated value of future transactions involving at least one of the sender and the recipient using a decision function, the decision function defining a weight for each of the collected inputs, wherein the estimated future transaction value indicates a number of estimated additional payment transactions that will result if the current electronic payment is rewarded; and
determine whether to reward the sender of the electronic payment by comparing the estimated future transaction value to a threshold value defining a limit at which rewarding the sender or the recipient of the electronic payment may incentivize future use of the electronic payment system, wherein the sender or recipient is rewarded if the estimated future transaction value meets or exceeds the threshold value; and
communicate a notification of a reward to the application executing on the remote computing device associated with the sender for display on the remote computing device in response to the estimated future transaction value meeting or exceeding the threshold value.

17. The system of claim 16, the transaction parameter data set comprising a retention transaction parameter data set comprising a frequency of interaction input between the sender and the recipient, a location information input of the sender and recipient, and a time a day input for the electronic payment.

18. The system of claim 16, the transaction parameter data set comprising a new user transaction parameter data set comprising a size of the sender's social graph input, a size of the recipient's social graph input, a time of day input for the electronic payment, and a number of electronic payment system users at the recipient's location input.

19. The system of claim 16, the transaction parameter data set comprising a new merchant transaction parameter data set comprising a transaction volume input for the merchant, a payment amount input for the electronic payment, a merchant type input, and a merchant location input.

* * * * *